(12) United States Patent
Hirata

(10) Patent No.: US 8,976,140 B2
(45) Date of Patent: Mar. 10, 2015

(54) TOUCH INPUT PROCESSOR, INFORMATION PROCESSOR, AND TOUCH INPUT CONTROL METHOD

(71) Applicant: Sony Computer Entertainment Inc., Tokyo (JP)

(72) Inventor: Shinichi Hirata, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 139 days.

(21) Appl. No.: 13/921,551

(22) Filed: Jun. 19, 2013

(65) Prior Publication Data

US 2013/0278530 A1 Oct. 24, 2013

Related U.S. Application Data

(63) Continuation of application No. PCT/JP2011/007088, filed on Dec. 19, 2011.

(30) Foreign Application Priority Data

Dec. 24, 2010 (JP) ................................. 2010-288131

(51) Int. Cl.
*G06F 3/041* (2006.01)
*G06F 3/0484* (2013.01)
*G06F 3/0488* (2013.01)

(52) U.S. Cl.
CPC .......... *G06F 3/04845* (2013.01); *G06F 3/0416* (2013.01); *G06F 3/04883* (2013.01); *G06F 2203/04104* (2013.01); *G06F 2203/04806* (2013.01)
USPC ....................................................... 345/173

(58) Field of Classification Search
None
See application file for complete search history.

(56) References Cited

U.S. PATENT DOCUMENTS

| 5,455,906 | A | 10/1995 | Usuda |
| 7,268,772 | B2 | 9/2007 | Kawai |

(Continued)

FOREIGN PATENT DOCUMENTS

| JP | 62150423 A | 7/1987 |
| JP | 05330289 A | 12/1993 |

(Continued)

OTHER PUBLICATIONS

Office Action for corresponding Japanese Patent Application No. 2010-288131, dated Sep. 2, 2014.

(Continued)

*Primary Examiner* — Nicholas Lee
(74) *Attorney, Agent, or Firm* — Matthew B. Dernier, Esq; Gibson & Dernier LLP

(57) ABSTRACT

A touch coordinate acquisition unit acquires the coordinate position of a touch point on a touch panel. An area determination unit determines whether or not the coordinate position of a touch point is present within an enlarging operation area provided in part of the touch panel. A drag determination unit determines if a touch point has been dragged. When the coordinate position of a touch point is present within the enlarging operation area and the touch point has been dragged, an operation mode switching unit switches the operation mode for touch inputs from a normal operation mode to an enlarging operation mode. When the operation mode is switched to the enlarging operation mode, a touch coordinate transformation unit transforms the coordinates of an actual touch point within the enlarging operation area into the coordinates of a virtual touch point for the whole area of the touch panel.

11 Claims, 14 Drawing Sheets

(56) References Cited

U.S. PATENT DOCUMENTS

| | | |
|---|---|---|
| 8,046,685 B2 | 10/2011 | Kishi |
| 2004/0196267 A1 | 10/2004 | Kawai |
| 2009/0070670 A1 | 3/2009 | Kishi |
| 2009/0091547 A1 | 4/2009 | Kikuoka |
| 2009/0109187 A1 | 4/2009 | Noma |
| 2009/0160805 A1 | 6/2009 | Hosokawa |

FOREIGN PATENT DOCUMENTS

| | | |
|---|---|---|
| JP | 11259237 A | 9/1999 |
| JP | 2004310219 A | 11/2004 |
| JP | 2006012039 A | 1/2006 |
| JP | 2009064209 A | 3/2009 |
| JP | 2009087295 A | 4/2009 |
| JP | 2009110286 A | 5/2009 |
| JP | 2009151718 A | 7/2009 |
| JP | 2009282637 A | 12/2009 |
| JP | 2010026064 A | 2/2010 |

OTHER PUBLICATIONS

International Search Report for the corresponding PCT Application No. PCT/JP2011/007088, dated Jan. 24, 2012.

International Preliminary Examination Report on Patentability with Written Opinion for the corresponding PCT Application No. PCT/JP2011/007088, dated Jul. 2, 2013.

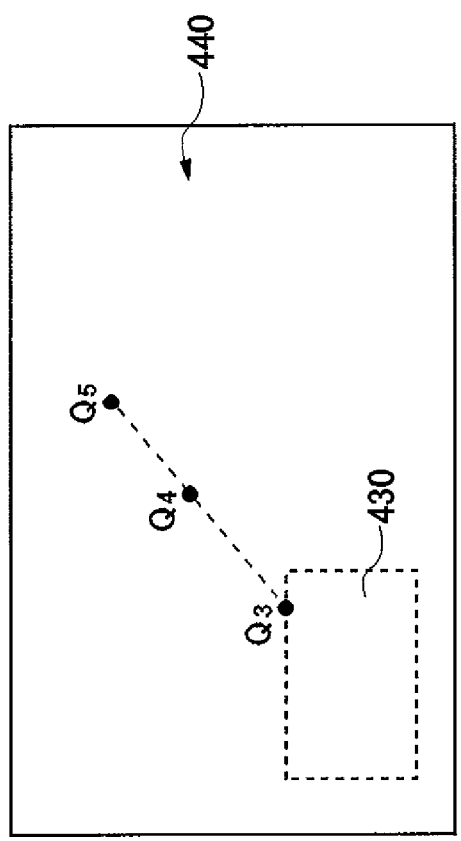
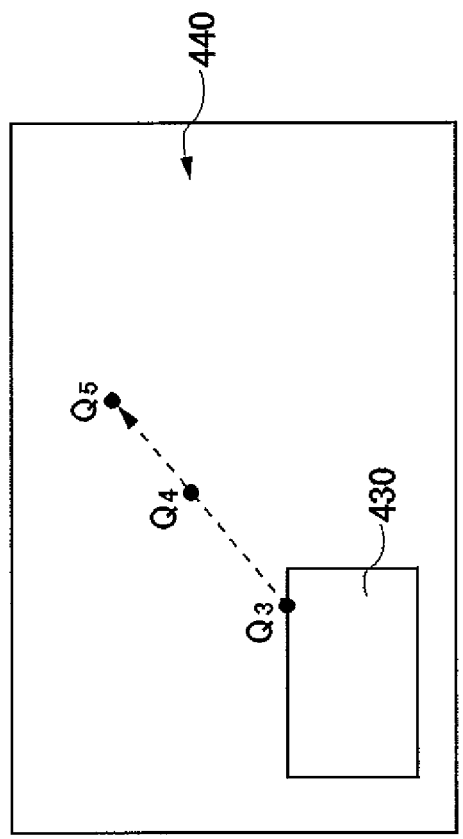
FIG.10B
FIG.10A

TOUCH INPUT PROCESSOR, INFORMATION PROCESSOR, AND TOUCH INPUT CONTROL METHOD

BACKGROUND OF THE INVENTION

1. Field of the Invention

The present invention relates to an apparatus and a method for processing an input to a touch panel.

2. Description of the Related Art

Interface devices including touch panels and touch pads, to which inputs can be made when a person directly touches the display screen of the device using a finger, are widely used in personal computers, various mobile devices, cellular phones, and the likes. Also, there have been recently developed devices that can acquire attribute information on a touch point besides the coordinates thereof, such as the strength (pressure) of the touch and the direction of the finger.

Patent document 1 discloses a portable image display apparatus provided with display screens on both the front and rear surfaces thereof.

[Patent Document 1] Japanese Patent Application Laid-open No. 2010-26064.

Nowadays, an increasing number of mobile terminals are provided with a touch panel display of a size large enough to enhance viewability of the display screen or facilitate browsing of high-quality images. Accordingly, it has become difficult to operate a mobile terminal by touching every part of the touch panel display thereof using a finger of the hand holding the mobile terminal. Especially, users who have smaller hands, such as children and women, may be unable to reach, while holding the mobile terminal with one hand, a distant part of the touch panel display of the mobile terminal using a finger of the same hand, and hence, they may be unable to touch all the parts of the display.

SUMMARY OF THE INVENTION

The present invention has been made in view of such a problem, and a purpose thereof is to provide a technique for enabling easy touch operation for the whole area of a touch panel.

To solve the problem above, a touch input processor of an embodiment of the present invention comprises: a touch coordinate acquisition unit configured to acquire the coordinate position of a touch point on a touch panel; an area determination unit configured to determine whether or not the coordinate position of a touch point is present within an enlarging operation area on the touch panel, part of the touch panel being defined as the enlarging operation area used to operate the whole area of the touch panel; a drag determination unit configured to determine if a touch point has been dragged; an operation mode switching unit configured to switch, when the coordinate position of a touch point is present within the enlarging operation area and the touch point has been dragged, the operation mode for touch input from a normal operation mode to an enlarging operation mode; and a touch coordinate transformation unit configured to transform, when the operation mode is switched to the enlarging operation mode, the coordinates of an actual touch point within the enlarging operation area into the coordinates of a virtual touch point for an entire area of the touch panel.

Another embodiment of the present invention is an information processor. The information processor comprises: a touch panel unit including a touch panel and a touch panel controller configured to detect a touch input on the touch panel and output the touch input as a signal; a touch input processing unit configured to process information on a touch input detected by the touch panel unit; and a display control unit configured to control data to be displayed on a display device on which the touch panel is provided. The touch input processing unit includes: a touch coordinate acquisition unit configured to acquire the coordinate position of a touch point; an area determination unit configured to determine whether or not the coordinate position of a touch point is present within an enlarging operation area on the touch panel, part of the touch panel being defined as the enlarging operation area used to operate an entire area of the touch panel; a drag determination unit configured to determine if a touch point has been dragged; an operation mode switching unit configured to switch, when the coordinate position of a touch point is present within the enlarging operation area and the touch point has been dragged, the operation mode for touch input to an enlarging operation mode; and a touch coordinate transformation unit configured to transform, when the operation mode is switched to the enlarging operation mode, the coordinates of an actual touch point within the enlarging operation area into the coordinates of a virtual touch point for the entire area of the touch panel.

Yet another embodiment of the present invention is a touch input control method. The method is a touch input control method for controlling a touch input on a touch panel, and the method comprises: acquiring the coordinate position of a touch point on a touch panel; determining whether or not the coordinate position of a touch point is present within an enlarging operation area on the touch panel, part of the touch panel being defined as the enlarging operation area used to operate an entire area of the touch panel; determining if a touch point has been dragged; switching, when the coordinate position of a touch point is present within the enlarging operation area and the touch point has been dragged, the operation mode for touch input from a normal operation mode to an enlarging operation mode; and transforming, when the operation mode is switched to the enlarging operation mode, the coordinates of an actual touch point within the enlarging operation area into the coordinates of a virtual touch point for the entire area of the touch panel.

Optional combinations of the aforementioned constituting elements, and implementations of the invention in the form of methods, apparatuses, systems, computer programs, data structures, and recording media may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 10A and 10B are diagrams that show relationships between actual touch points and virtual pointing positions in the normal operation mode;

DETAILED DESCRIPTION OF THE INVENTION

The invention will now be described by reference to the preferred embodiments. This does not intend to limit the scope of the present invention, but to exemplify the invention.

Figure 1:
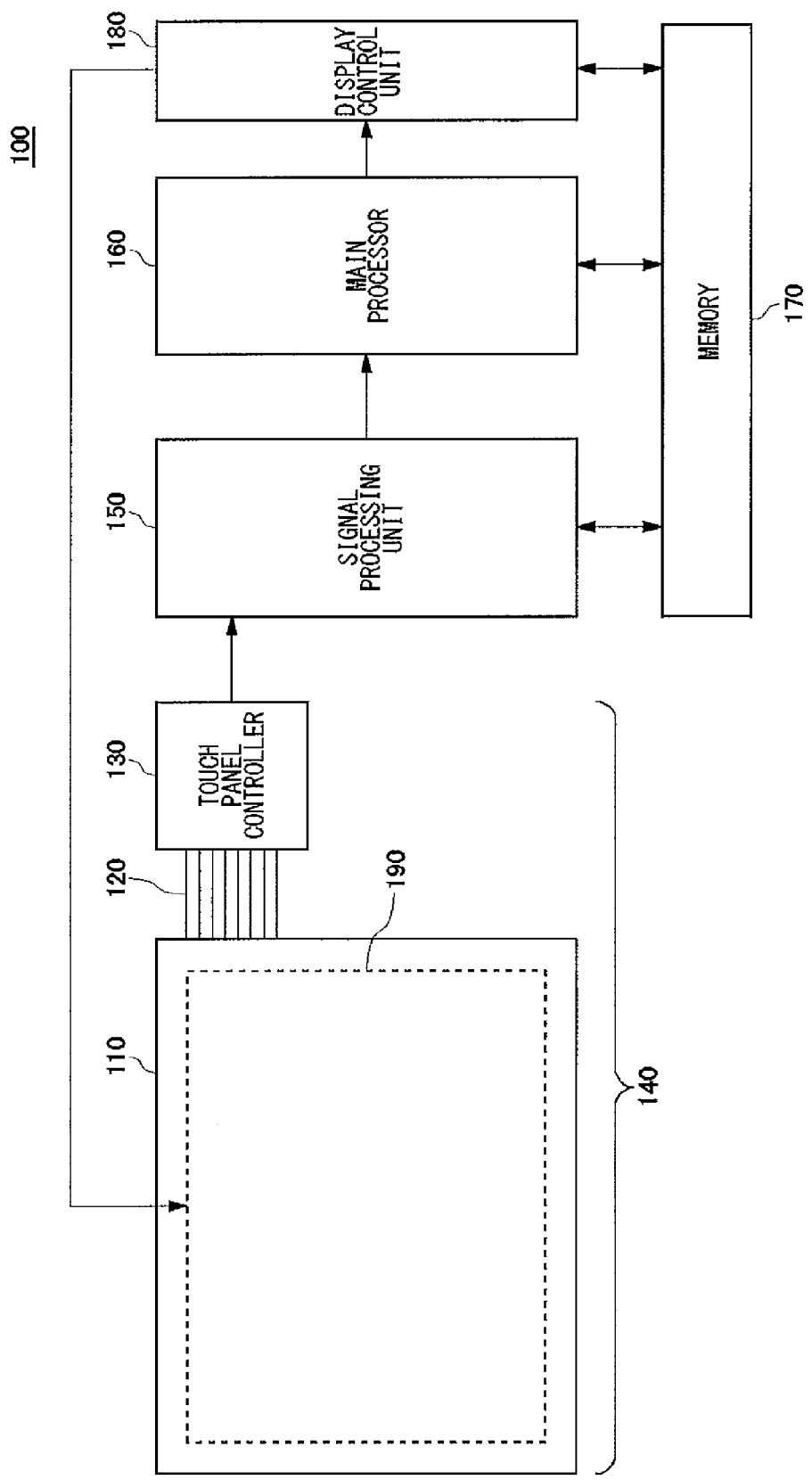
FIG. 1 is a configuration diagram of an information processor according to an embodiment.

FIG. 1 is a configuration diagram of an information processor 100 according to an embodiment. Part of or all of the functional configurations in the information processor 100 shown in FIG. 1 may be implemented by hardware, software, or a combination thereof provided in a personal computer, a game device, a mobile device, or a mobile terminal, for example.

The information processor 100 comprises a touch panel unit 140, a signal processing unit 150, a main processor 160, a memory 170, a display control unit 180, and a display 190.

The touch panel unit 140 includes a touch panel 110 and a touch panel controller 130 connected to the touch panel 110 via a flexible substrate 120.

The touch panel 110 is an input device that detects, using various methods, a point (position) of contact by a finger or the like (hereinafter, referred to as a "touch point (position)") and a parameter such as electrostatic capacitance or electric resistance indicating the contact state at the touch point (position) (hereinafter, referred to as "touch state quantity"). The touch panel 110 is mounted on the display 190, which may be a liquid crystal display or an organic EL (electroluminescence) display, for example. This allows a user viewing the screen of the display 190 to provide an input for control on the screen by directly touching the touch panel 110 with a finger.

The touch panel 110 is a capacitive type touch panel, for example. The touch panel controller 130 measures an amount of variation in electrostatic capacitance at respective points on the touch panel 110 so as to detect the position of a touch point and the electrostatic capacitance value at the touch point.

Although the touch panel 110 of a capacitive type is described as an example, the type is not limited thereto and an arbitrary type of a touch panel may be used as long as a measurement can be obtained as time-series data when the touch panel is touched by a finger or a pen. For example, the touch panel 110 may be a pressure sensitive touch panel or an optical touch panel.

The signal processing unit 150 obtains time-series data of the electrostatic capacitance at a touch point detected by the touch panel controller 130, performs signal processing while reading or writing data from or into the memory 170, and outputs the position coordinates of the touch point at each time.

The main processor 160 receives from the signal processing unit 150 the position coordinates of a touch point at each time and performs operation according to an instruction provided by a touch input. The main processor 160 performs processing for a touch input using a library for standard touch input processing loaded in the memory 170. The main processor 160 detects various touch inputs to the touch panel, such as a tap, a double tap, and dragging, and performs operation according to the type of the touch input. For example, when the input is a tap, the main processor 160 selects an object, a file, a button, or a menu displayed at the tapped position; when it is a double tap, the main processor 160 zooms in on or zooms out from the tapped position or opens a selected file; when it is dragging, the main processor 160 moves an icon or object at the touch position or scrolls the screen.

The display control unit 180 displays a game screen, an output screen of an application, or the like on the display 190. Also, in order to visually convey to the user a touch position on the touch panel 110, the display control unit 180 is capable of providing an effect to emphasize a touch position on the display screen, such as displaying a cursor at the touch position, zooming in on an image at the touch position, and highlighting the touch position.

Figure 2:
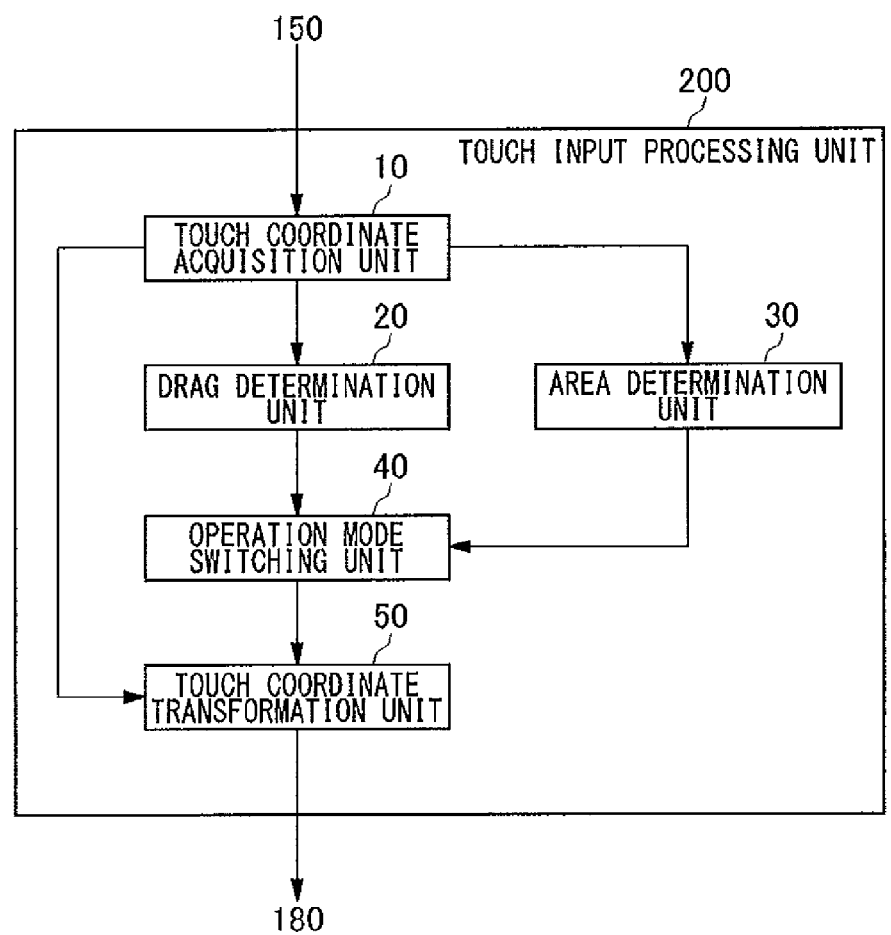
FIG. 2 is a configuration diagram of a touch input processing unit.

FIG. 2 is a configuration diagram of a touch input processing unit 200. Each function of the touch input processing unit 200 is retained as program code in the memory 170 and retrieved therefrom by the main processor 160 to be executed. At least part of the functions of the touch input processing unit 200 may be implemented by dedicated hardware.

A touch coordinate acquisition unit 10 acquires from the signal processing unit 150 the position coordinates of a touch point and provides the acquired position coordinates to a drag determination unit 20, an area determination unit 30, and a touch coordinate transformation unit 50.

Figure 3:
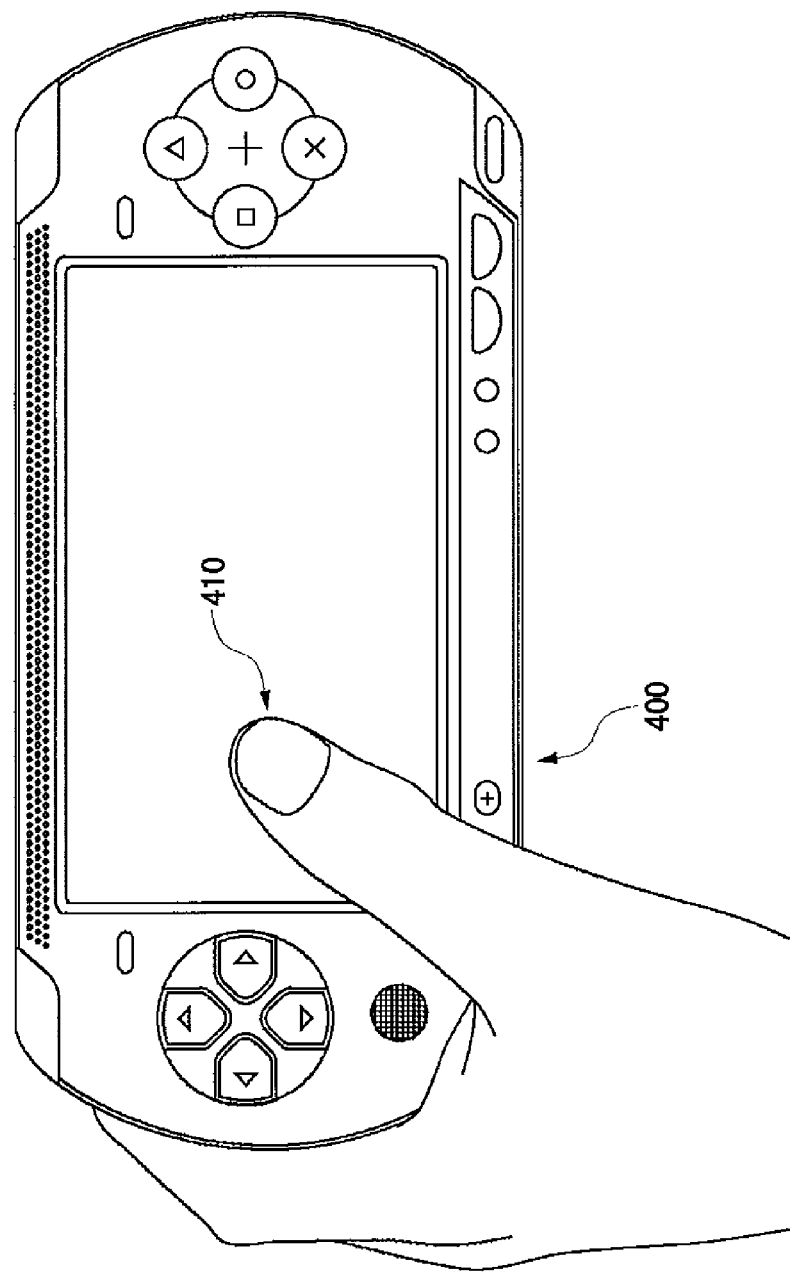
FIG. 3 is a diagram that shows a touch input position on a portable game device.

FIG. 3 is a diagram that shows a touch input position on a portable game device 400. FIG. 3 shows a situation where the user holds the portable game device 400 with the left hand, and the user can touch the touch panel on the display with the left thumb 410 to provide an operation input to the screen. The user can touch the touch panel within the reach of the thumb 410 of the left hand holding the portable game device 400. If the portable game device 400 is small, the user can touch at least the left half of the touch panel and may also be able to reach the right half thereof with the left thumb 410 by changing the way of holding the device. If the user holds the portable game device 400 in both hands, the user can touch the right half of the touch panel using the right thumb, so that the user can touch almost the whole area of the touch panel with both hands to provide operation including tapping, double tapping, and dragging on the screen.

Figure 4:
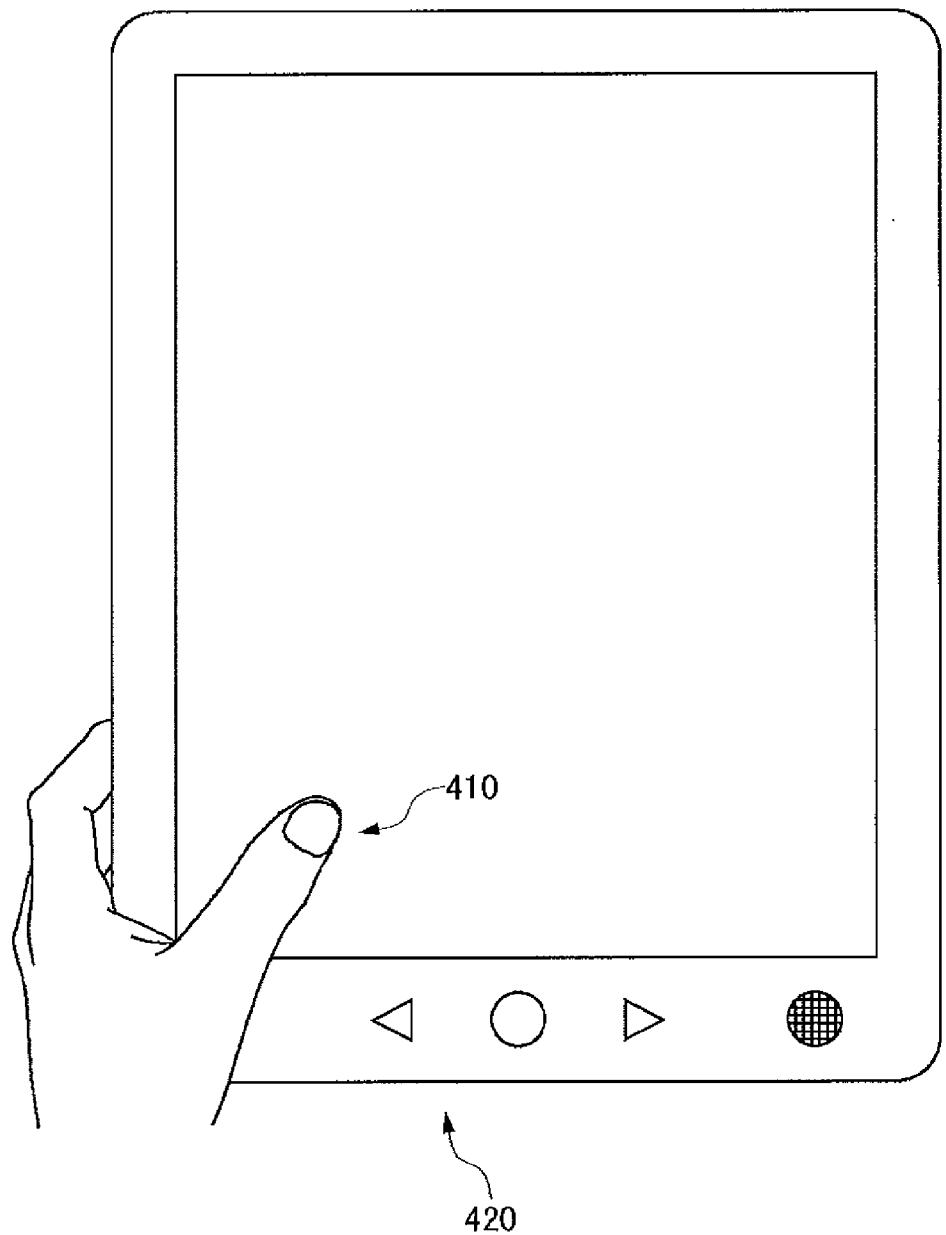
FIG. 4 is a diagram that shows a touch input position on a notebook-size mobile terminal.

FIG. 4 is a diagram that shows a touch input position on a notebook-size mobile terminal 420. With the notebook-size mobile terminal 420, since the area of the touch panel on the display thereof is large, the reach of the thumb 410 of the left hand holding the mobile terminal 420 is limited and the user cannot touch the whole area of the touch panel only with the left thumb 410.

Therefore, the present embodiment provides an example in which the reach of the thumb 410 of the left hand holding the mobile terminal is specified as an enlarging operation area, and the coordinates of a touch point are transformed so that the actual touch input within the enlarging operation area is converted into a virtual touch input for the whole area of the touch panel. Accordingly, providing a touch input within the enlarging operation area enables a touch input for the whole area of the touch panel.

Figure 5:
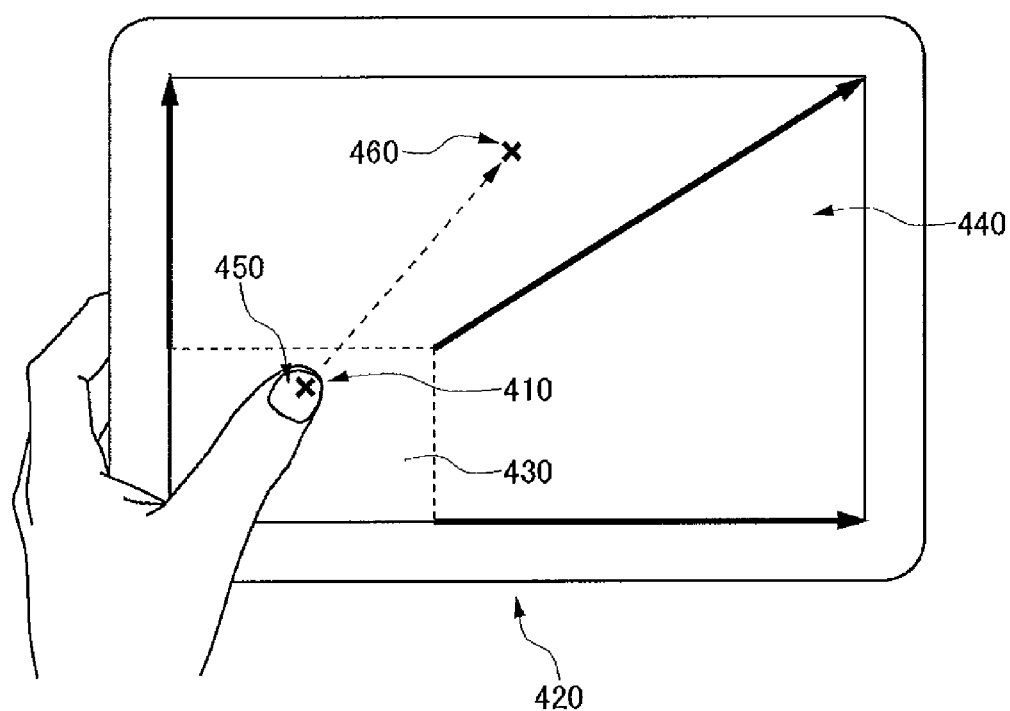
FIG. 5 is a diagram that shows an enlarging operation area on a touch panel and scaling for the coordinates of a touch point.

FIG. 5 is a diagram that shows an enlarging operation area on a touch panel and scaling for the coordinates of a touch point.

A partial area of the touch panel of the mobile terminal 420, which is the reach of the thumb 410 of the left hand holding the mobile terminal 420 in this case, is specified as an enlarging operation area 430. The area other than the enlarging operation area 430 on the touch panel is referred to as a normal operation area 440. The coordinates of an actual touch point 450 provided by the thumb 410 within the enlarging operation area 430 are transformed into the coordinates of a virtual touch point 460 through scaling by which the enlarging operation area 430 is scaled up to the whole area of the touch panel. Although the user actually touches the touch point 450 within the enlarging operation area 430 using the thumb 410, it is deemed, through coordinate transformation, that the virtual touch point 460 on the touch panel is touched.

Although the reach of the thumb of the hand holding the mobile terminal 420 is specified as the enlarging operation area 430 in the above example, any area on the touch panel may be specified as the enlarging operation area 430 according to the user's preference. If the user holds the mobile terminal 420 with the right hand, for example, the reach of the right thumb may be specified as the enlarging operation area 430, or, irrespective of the position of the thumb of the hand holding the mobile terminal, an area on the touch panel that can be easily touched may be specified as the enlarging operation area 430. Also, if a touch input is provided by touching the touch panel with an index finger, an area that can be touched by the index finger may be specified as the enlarging operation area 430. Further, the enlarging operation area 430 may be set by each application or may be specified by the user. The display control unit 180 may provide an effect to the image in the enlarging operation area 430, such as displaying the frame of the enlarging operation area 430, so as to inform the user of the area specified as the enlarging operation area 430.

Referring back to FIG. 2, the area determination unit 30 determines whether or not the coordinates of a touch point are present within the enlarging operation area and notifies an operation mode switching unit 40 of the result indicating whether the touch point is included in the enlarging operation area or in the normal operation area.

The drag determination unit 20 determines if a touch point has been dragged. The drag determination unit 20 examines the time-series data of the position coordinates of a touch point to see if there is a change in the position coordinates, and, if the position coordinates have continuously changed, the drag determination unit 20 determines that the user is touching the touch panel and dragging the touch point. The drag determination unit 20 then notifies the operation mode switching unit 40 of the result indicating whether the touch point has been dragged.

When a touch point is present within the enlarging operation area and has been dragged, the operation mode switching unit 40 switches the operation mode for touch inputs from the normal operation mode to the enlarging operation mode. In the normal operation mode, the position of an actual touch point is regarded, as it is, as a touch position on the touch panel, while, in the enlarging operation mode, the coordinates of a touch point are transformed so that the actual touch input within the enlarging operation area is converted into a virtual touch input for the whole area of the touch panel.

When a touch point is present in the normal operation area, the operation mode switching unit 40 sets the operation mode for touch inputs to the normal operation mode. In the normal operation mode, the coordinates of an actual touch point in the normal operation area are used as those of a touch position on the touch panel.

When a touch point is present within the enlarging operation area but has not been dragged, the operation mode switching unit 40 maintains the normal operation mode instead of switching it to the enlarging operation mode.

If a touch point provided within the enlarging operation area is dragged therefrom to the normal operation area, the operation mode switching unit 40 will switch the operation mode from the enlarging operation mode to the normal operation mode. On the other hand, if a touch point provided within the normal operation area is dragged therefrom into the enlarging operation area, the operation mode switching unit 40 will maintain the normal operation mode instead of switching it to the enlarging operation mode.

The operation mode switching unit 40 notifies the touch coordinate transformation unit 50 of the determined operation mode. The touch coordinate transformation unit 50 then transforms the coordinates of an actual touch point acquired from the touch coordinate acquisition unit 10 depending on the operation mode. In the enlarging operation mode, the touch coordinate transformation unit 50 transforms the coordinates of an actual touch point so that the touch input within the enlarging operation area is converted into a touch input for the whole area of the touch panel; in the normal operation mode, on the other hand, the touch coordinate transformation unit 50 does not transform the coordinates of an actual touch point and outputs the coordinates as those of a touch position on the touch panel.

Figure 6:
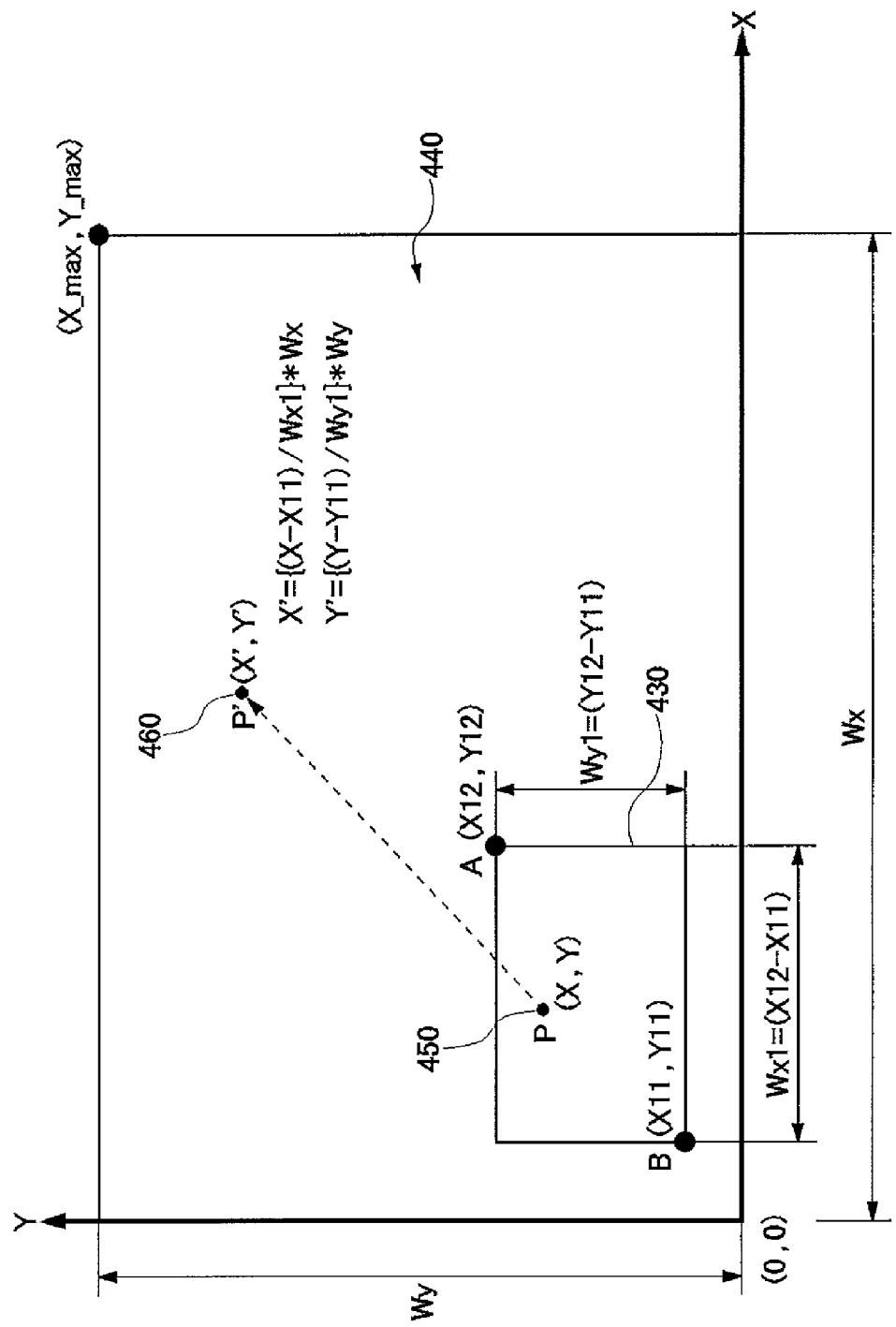
FIG. 6 is a diagram that shows coordinate transformation for a touch point performed by a touch coordinate transformation unit shown in FIG. 2.

FIG. 6 is a diagram that shows coordinate transformation for a touch point performed by the touch coordinate transformation unit 50. The horizontal direction of the touch panel is defined as the X-axis, and the vertical direction thereof is defined as the Y-axis. Also, the bottom-left corner of the touch panel is defined as the point of origin (0,0), and the coordinates of the upper-right corner thereof are defined as (X_max, Y_max). The horizontal size Wx of the touch panel is X_max, and the vertical size Wy thereof is Y_max.

The enlarging operation area 430 is a rectangular area shown in FIG. 6, and the coordinates of the upper-right vertex A are defined as (X12,Y12), and the coordinates of the bottom-left vertex B are defined as (X11,Y11). The horizontal size Wx1 of the enlarging operation area 430 is defined by Wx1=X12−X11, and the vertical size Wy1 thereof is defined by Wy1=Y12−Y11.

The coordinates of the bottom-left vertex B of the enlarging operation area 430 are not set to the origin (0,0), because, when the user holds the mobile terminal 420 with the left hand, it is difficult for the user to touch the vicinity of the origin at the bottom-left corner of the touch panel with the left thumb, and hence, the vicinity of the origin should preferably be excluded from the enlarging operation area 430. This is a matter of design for implementation, and, even if the coordinates of the bottom-left vertex B of the enlarging operation area 430 are set to the origin (0,0) (i.e., X11=Y11=0), the basic operation will not be different.

In the enlarging operation mode, an actual touch point P(X,Y) within the enlarging operation area 430 is transformed into a virtual touch point P'(X',Y') for the whole area of the touch panel through coordinate transformation as defined by the following formulae:

$$X'=\{(X-X11)/Wx1\} \times Wx$$

$$Y'=\{(Y-Y11)/Wy1\} \times Wy$$

Through such coordinate transformation, when a position (symbol 450) within the enlarging operation area is actually touched in the enlarging operation mode, it is deemed that another position (symbol 460) in the normal operation area on the touch panel is virtually touched. In the normal operation mode, on the other hand, an actual touch position within the enlarging operation area is regarded, as it is, as a touch position on the touch panel.

Figure 7:
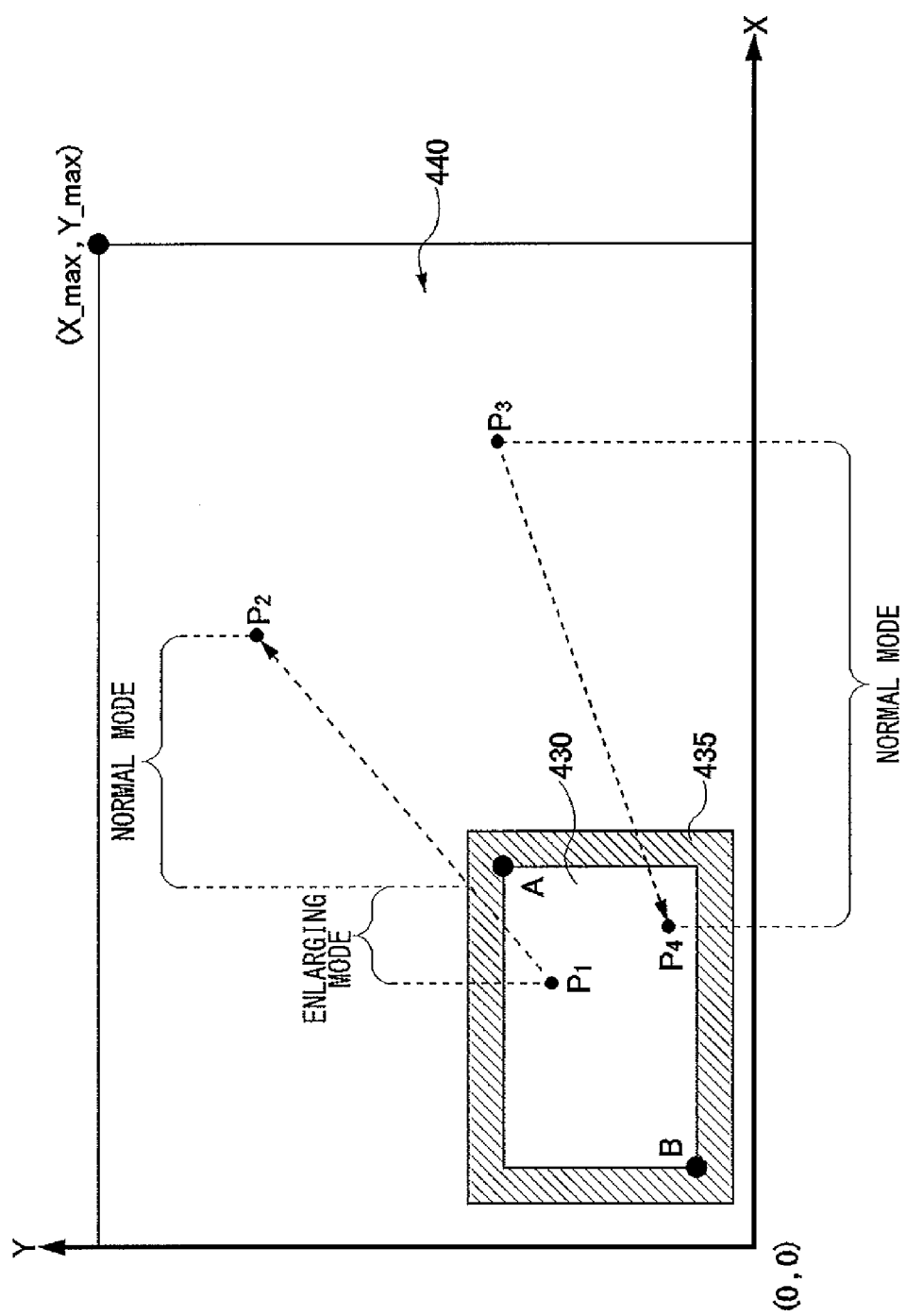
FIG. 7 is a diagram that shows switching of an operation mode performed by an operation mode switching unit shown in FIG. 2.

FIG. 7 is a diagram that shows switching of the operation mode performed by the operation mode switching unit 40. A coordinate system is defined on the touch panel in the same way as in FIG. 6, and a transition area 435 is further provided around the enlarging operation area 430. The transition area 435 is provided as a margin of the enlarging operation area 430. For example, when it is assumed that an area touched by a finger is approximated by a circle, a margin of about half the diameter of the circle, i.e., a margin of about 3 millimeters, may be provided around the enlarging operation area 430. Then, when a touch input is provided within the transition area 435 thus provided as a margin, the touch input is regarded as provided within the enlarging operation area 430. With such a margin, an error in the position of a touch input provided by a finger near the boundary of the enlarging operation area can be absorbed.

It is assumed here that a touch point P1 within the enlarging operation area 430 is touched and dragged therefrom to a touch point P2 in the normal operation area 440 before the finger is released from the touch panel. In the locus of the touch point moving from the touch point P1 within the enlarging operation area 430 to the touch point P2 in the normal operation area 440, the portion included in the enlarging operation area 430 and transition area 435 is set to the enlarging operation mode by the operation mode switching unit 40, whereas the portion outside the enlarging operation area 430 and transition area 435 is set to the normal operation mode. In this way, when a touch is started within the enlarging operation area 430 and the touch point is dragged, the operation mode is set to the enlarging operation mode at first; thereafter, once the touch point is dragged out of the enlarging operation area 430 and enters the normal operation area 440, the mode is switched to the normal operation mode.

It is now assumed that a touch point P3 in the normal operation area 440 is touched and dragged therefrom into the enlarging operation area 430 to be moved to a touch point P4 within the enlarging operation area 430 before the finger is released from the touch panel. In this case, for the whole locus of the touch point moving from the touch point P3 in the normal operation area 440 to the touch point P4 within the enlarging operation area 430 is set the normal operation mode by the operation mode switching unit 40. Thus, when a touch is started within the normal operation area 440 and the touch point is dragged, the normal operation mode is maintained even after the touch point enters the enlarging operation area 430.

Figure 8:
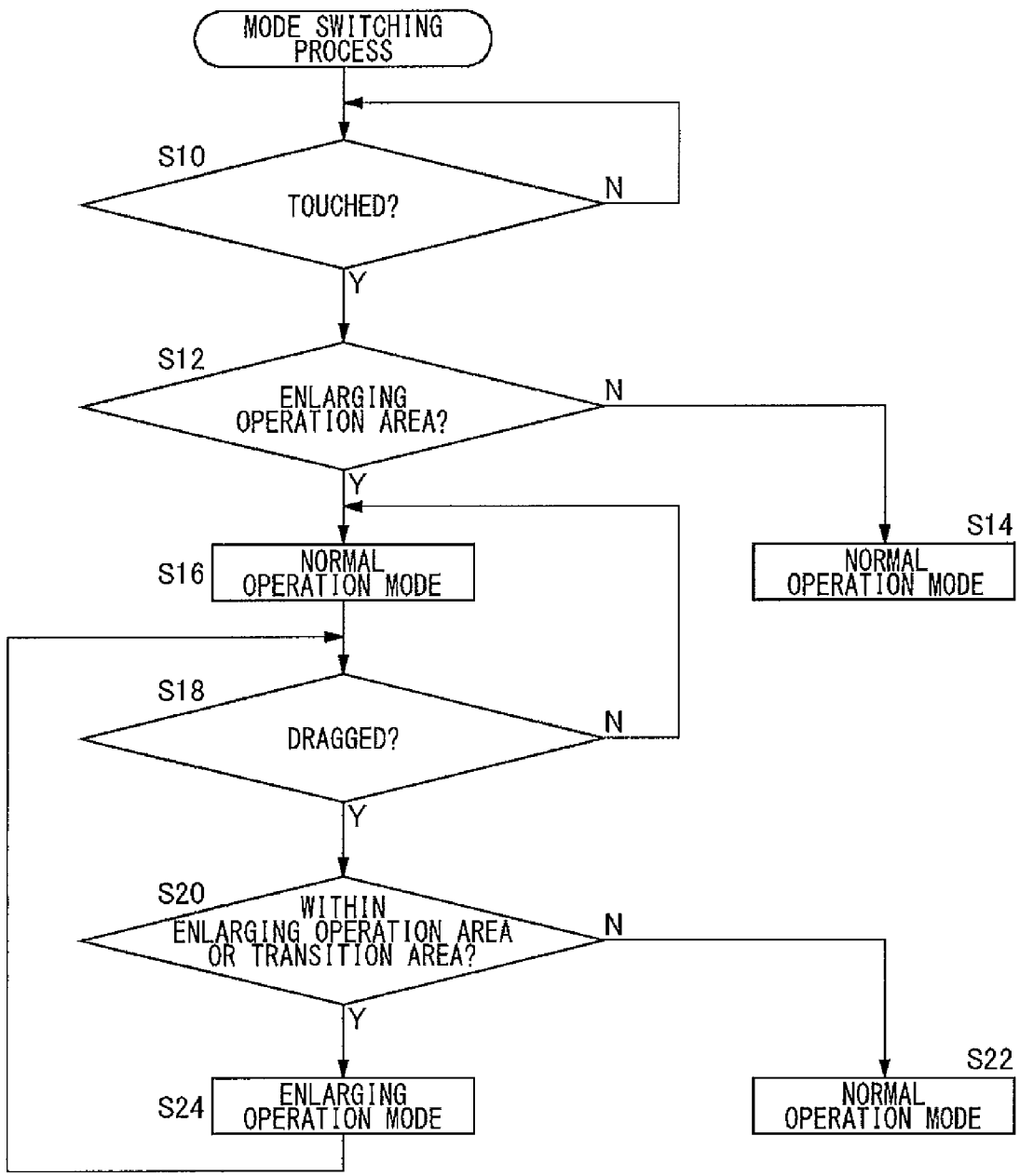
FIG. 8 is a flowchart that shows an operation mode switching process performed by the touch input processing unit shown in FIG. 2.

FIG. 8 is a flowchart that shows an operation mode switching process performed by the touch input processing unit 200. With regard to the flowchart shown in FIG. 8, a procedure performed by each unit is denoted by a combination of the letter S, meaning a step (the initial letter of Step), and a number. Also, when a determination process is performed in processing denoted by a combination of the letter S and a number, the case where the determination result is positive is expressed, for example, as (Y at S10) using the letter Y (the initial letter of Yes); on the other hand, the case where the determination result is negative is expressed, for example, as (N at S10) using the letter N (the initial letter of No).

When the touch panel is touched (Y at S10), the touch coordinate acquisition unit 10 acquires the position coordinates of the touch point. If the touch panel is not touched (N at S10), the process of detecting a touch input at the step S10 will be repeated.

The area determination unit 30 determines whether or not the position coordinates of the touch point are present within the enlarging operation area (S12). If the touch point is not present within the enlarging operation area (N at S12), the operation mode switching unit 40 will set the operation mode for touch inputs to the normal operation mode (S14). If the touch point is present within the enlarging operation area (Y at S12), the operation mode switching unit 40 will once set the operation mode also to the normal operation mode (S16).

The drag determination unit 20 then determines if the touch point within the enlarging operation area has been dragged (S18). If the touch point within the enlarging operation area has not been dragged before the finger is released from the touch panel (N at S18), the process will return to the step S16 and the operation mode switching unit 40 will maintain the normal operation mode. In such a case, the user has merely tapped a point within the enlarging operation area. When a point within the enlarging operation area is tapped, coordinate transformation is not performed for the touch point, so that the position of the touch point within the enlarging operation area is regarded, as it is, as a touch position on the touch panel.

If the touch point within the enlarging operation area has been dragged (Y at S18), the process will proceed to the step S20 and the area determination unit 30 will determine whether or not the dragged touch point is present within the enlarging operation area or a transition area provided around the enlarging operation area. If the dragged touch point is still present within the enlarging operation area or the transition area (Y at S20), the operation mode switching unit 40 will switch the operation mode from the normal operation mode to the enlarging operation mode (S24) and the process will return to the step S18. If the dragged touch point has been moved out of the enlarging operation area or the transition area and has entered the normal operation area (N at S20), the operation mode switching unit 40 will set the operation mode to the normal operation mode (S22).

When the user touches a point within the enlarging operation area 430 and the operation mode is set to the enlarging operation mode, it is difficult to find out which position is pointed to on the touch panel. Accordingly, in the enlarging operation mode, a pointer or another icon may be displayed at the position of a virtual touch point P'(X',Y') for the whole area of the touch panel corresponding to an actual touch point P(X,Y) within the enlarging operation area 430 so that the user can visually find out the pointing position.

Figure 9B:
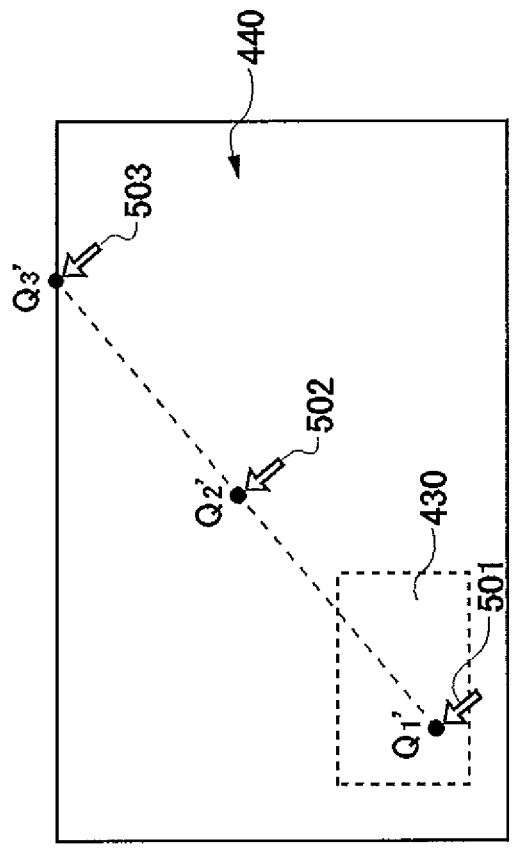
FIGS. 9A and 9B are diagrams that show relationships between actual touch points and pointers displayed at virtual pointing positions in the enlarging operation mode.
Figure 9A:
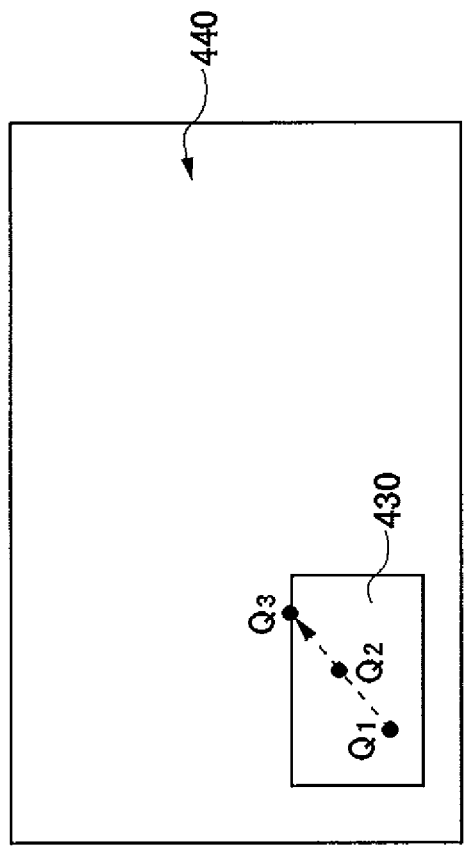

FIGS. 9A and 9B are diagrams that show relationships between actual touch points and pointers displayed at virtual pointing positions in the enlarging operation mode. In the interest of simplicity, the description will be made in disregard of the transition area 435 provided as a margin around the enlarging operation area 430.

As shown in FIG. 9A, it is assumed here that a touch point Q1 within the enlarging operation area 430 is touched and dragged, via a touch point Q2, to a touch point Q3 within the enlarging operation area 430. The movement locus of the touch point is indicated by an arrow of a dotted line. Since the operation mode is set to the enlarging operation mode while the actual touch points Q1, Q2, and Q3 are provided within the enlarging operation area 430, virtual touch points Q1', Q2', and Q3' for the whole area of the touch panel will be positioned as defined by the coordinate transformation formulae presented previously, as shown in FIG. 9B.

In the enlarging operation mode, although the user places a finger on the touch points Q1, Q2, and Q3 within the enlarging operation area 430 as shown in FIG. 9A, the virtual touch points Q1', Q2', and Q3' are positioned as shown in FIG. 9B. Accordingly, in order to allow the user to easily find out the positions virtually pointed to, pointers 501, 502, and 503 are displayed at the positions of the virtual touch points Q1', Q2', and Q3' so as to visually specify the pointing positions. Instead of displaying the pointers 501, 502, and 503, another effect may be provided such as zooming in on each of the positions of the virtual touch points Q1', Q2', and Q3' and the vicinity thereof.

FIGS. 10A and 10B are diagrams that show relationships between actual touch points and virtual pointing positions in the normal operation mode.

It is assumed here that the touch point Q3 at the boundary of the enlarging operation area 430 shown in FIG. 9A is further dragged out of the enlarging operation area 430 and moved, via a touch point Q4, to a touch point Q5 in the normal operation area 440, as shown in FIG. 10A. The movement locus of the touch point is indicated by an arrow of a dotted line. When a touch point is moved out of the enlarging operation area 430 and enters the normal operation area 440, the operation mode is switched to the normal operation mode. Since coordinate transformation is not performed in the normal operation mode, the actual touch points Q3, Q4, and Q5 are regarded, as they are, as the touch points Q3, Q4, and Q5 for the touch panel, as shown in FIG. 10B.

In the normal operation mode, the user places a finger on the touch points Q3, Q4, and Q5 in the normal operation area 440 as shown in FIG. 10A, and the touch points are used, as they are, as the touch points Q3, Q4, and Q5 for the touch panel as shown in FIG. 10B. Since the position of the finger will be the position of a touch point for the touch panel, there is no need to display a pointer or the like to visually specify the pointing position. Accordingly, pointers are not displayed at the pointing positions on the display screen in the normal operation mode shown in FIG. 10B, unlike the display screen in the enlarging operation mode shown in FIG. 9B.

A pointer may be displayed also in the normal operation mode. Whether or not to display a pointer in the normal operation mode may be set by the user.

As shown in FIGS. 9A and 9B, since a pointer is displayed at the position of a virtual touch point in the enlarging operation mode, the user can visually find out the pointing position, improving the operational convenience. In addition, if a pointer is not displayed in the normal operation mode as shown in FIGS. 10A and 10B, since a pointer disappears when the operation mode is switched from the enlarging operation mode to the normal operation mode, the user can notice the switching from the enlarging operation mode to the normal operation mode and can provide operations appropriate for the operation mode without getting confused.

Although a single touch point is provided on the touch panel in the above description, if the touch panel supports multi-touch, multiple touch points will be provided. In the following, the operation mode switching process in the case of multi-touch input will be described.

Figure 11:
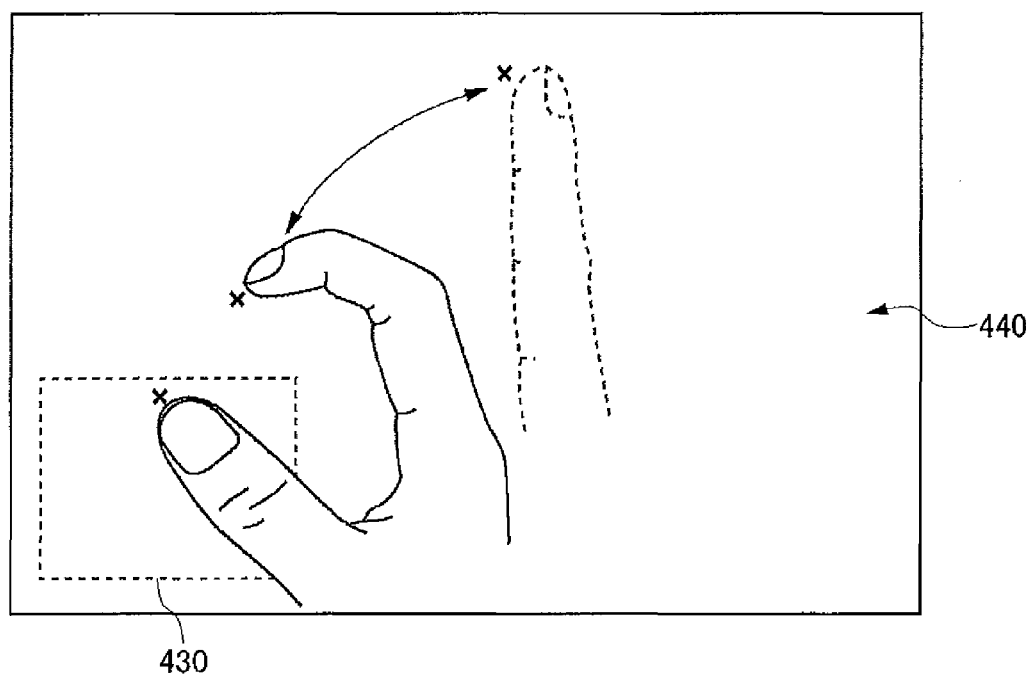
FIG. 11 is a diagram that shows an example of multi-touch input on a touch panel.

FIG. 11 is a diagram that shows an example of multi-touch input on a touch panel. FIG. 11 depicts a touch operation called a pinch. A pinch is an operation of touching two fingers to a touch panel just like pinching something so as to move the fingers away from each other (pinch out) or bring the fingers toward each other (pinch in).

In a pinch operation, for example, even if the thumb is placed within the enlarging operation area 430, the index finger will be placed in the normal operation area 440, as shown in FIG. 11. In such a case, if the operation mode switching unit 40 switches the operation mode to the enlarging operation mode just because dragging is provided by the thumb within the enlarging operation area 430, a touch input intended by the pinch operation will not be provided.

Accordingly, in the case of multi-touch input, if at least one of multiple touch points is present within the normal operation area 440, the operation mode switching unit 40 will set the operation mode for all the touch points to the normal operation mode.

Figure 12:
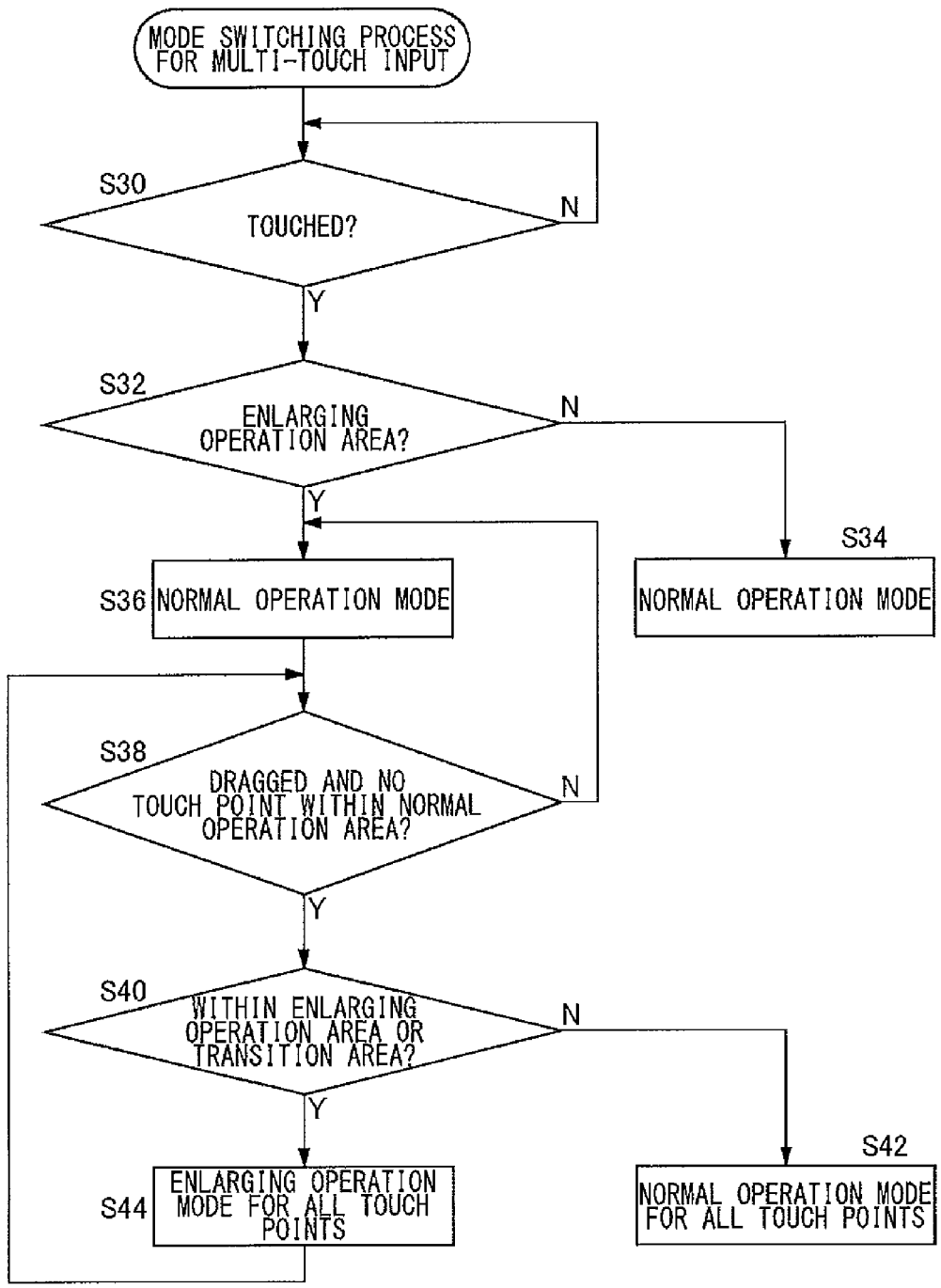
FIG. 12 is a flowchart that shows an operation mode switching process in the case of multi-touch input.

FIG. 12 is a flowchart that shows an operation mode switching process in the case of multi-touch input. Since the processes of the steps S30, S32, S34, and S36 for each touch point of multi-touch input are the same as those of the steps S10, S12, S14, and S16 in FIG. 8 for a touch point of single-touch input, respectively, the description thereof will be omitted.

In the step S38, the drag determination unit 20 determines whether at least one touch point within the enlarging operation area has been dragged, and the area determination unit 30 determines whether another touch point is present within the normal operation area. If the touch point within the enlarging operation area has not been dragged or if another touch point is present within the normal operation area (N at S38), the process will return to the step S36 and the operation mode switching unit 40 will maintain the normal operation mode. In this case, coordinate transformation is not performed for the at least one touch point within the enlarging operation area, so that the position of the at least one touch point within the enlarging operation area is regarded, as it is, as a touch position on the touch panel.

If at least one touch point within the enlarging operation area has been dragged and any other touch point is not present within the normal operation area (Y at S38), the process will proceed to the step S40 and the area determination unit 30 will determine whether or not the at least one touch point thus dragged is present within the enlarging operation area or a transition area provided around the enlarging operation area. If the at least one touch point thus dragged is still present within the enlarging operation area or the transition area (Y at S40), the operation mode switching unit 40 will switch the operation mode for all the touch points from the normal operation mode to the enlarging operation mode (S44) and the process will return to the step S38. If the at least one touch point thus dragged has been moved out of the enlarging operation area or the transition area (N at S40), the operation mode switching unit 40 will set the operation mode for all the touch points to the normal operation mode (S42).

FIGS. 13A-13D are diagrams that show examples of operation mode switching in the case of multi-touch input. The circled numbers in FIGS. 13 denote touch points and indicate that a touch point with a smaller number has been touched earlier. An arrow from a circled number indicates that the touch point has been dragged. Also, N denotes the normal operation mode, while E denotes the enlarging operation mode, and the changes of the operation mode for each touch point are shown in chronological order below each figure.

Figure 13A:
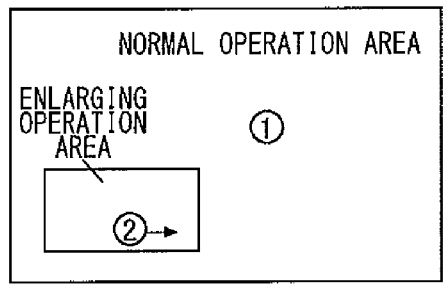
FIGS. 13A-13D are diagrams that show examples of operation mode switching in the case of multi-touch input.

In the case as shown in FIG. 13A, the first touch point is provided in the normal operation area, and the second touch point is provided in the enlarging operation area. The second touch point is then dragged within the enlarging operation area. Since the first touch point is in the normal operation mode N, the second touch point also stays placed in the normal operation mode N even when it is dragged. Namely, the normal operation mode N for the first touch point is transmitted to the second touch point.

Figure 13B:
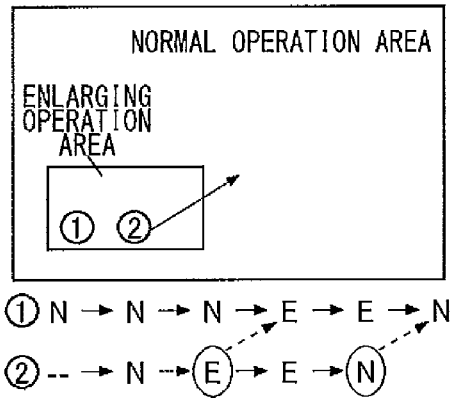

In the case as shown in FIG. 13B, the first touch point and the second touch point are both provided in the enlarging operation area, and the second touch point is then dragged out of the enlarging operation area. When the second touch point is dragged within the enlarging operation area, the operation mode therefor is switched from the normal operation mode N to the enlarging operation mode E. Accordingly, the operation mode for the first touch point is also switched from the normal operation mode N to the enlarging operation mode E. Thereafter, when the second touch point is further dragged out of the enlarging operation area, the operation mode for the second touch point is switched from the enlarging operation mode E to the normal operation mode N. Accordingly, the operation mode for the first touch point is also switched from the enlarging operation mode E to the normal operation mode N. In this case, the switching of the operation mode for the second touch point is transmitted to the first touch point.

Figure 13C:
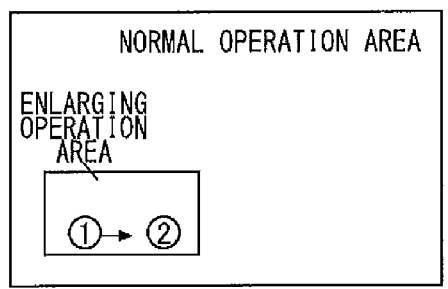

In the case as shown in FIG. 13C, the first touch point and the second touch point are both provided in the enlarging operation area, and the first touch point is then dragged within the enlarging operation area. When the first touch point is dragged within the enlarging operation area, the operation mode therefor is switched from the normal operation mode N to the enlarging operation mode E. Accordingly, the switching of the operation mode for the first touch point is transmitted to the second touch point, so that the operation mode for the second touch point is also switched from the normal operation mode N to the enlarging operation mode E.

Figure 13D:
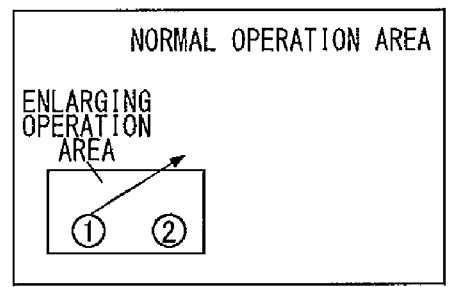

In the case as shown in FIG. 13D, the first touch point and the second touch point are both provided in the enlarging operation area, and the first touch point is then dragged out of the enlarging operation area. When the first touch point is dragged within the enlarging operation area, the operation mode therefor is switched from the normal operation mode N to the enlarging operation mode E; such switching is transmitted to the second touch point, so that the operation mode for the second touch point is also switched from the normal operation mode N to the enlarging operation mode E. Thereafter, when the first touch point is further dragged out of the enlarging operation area, the operation mode for the first touch point is switched from the enlarging operation mode E to the normal operation mode N; such switching is transmitted to the second touch point again, so that the operation mode for the second touch point is also switched from the enlarging operation mode E to the normal operation mode N.

FIGS. 14A-14D are diagrams that show other examples of operation mode switching in the case of multi-touch input.

Figure 14A:
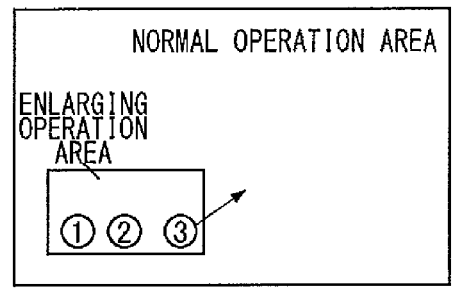
FIGS. 14A-14D are diagrams that show other examples of operation mode switching in the case of multi-touch input.

In the case as shown in FIG. 14A, the first touch point, the second touch point, and the third touch point are all provided in the enlarging operation area, and the third touch point is then dragged out of the enlarging operation area. When the third touch point is dragged within the enlarging operation area, the operation mode therefor is switched from the normal operation mode N to the enlarging operation mode E; such switching is transmitted to the first and second touch points, so that the operation mode for the first and second touch points is also switched from the normal operation mode N to the enlarging operation mode E. Thereafter, when the third touch point is further dragged out of the enlarging operation area, the operation mode for the third touch point is switched from the enlarging operation mode E to the normal operation mode N; such switching is transmitted to the first and second touch points again, so that the operation mode for the first and second touch points is also switched from the enlarging operation mode E to the normal operation mode N.

Figure 14B:
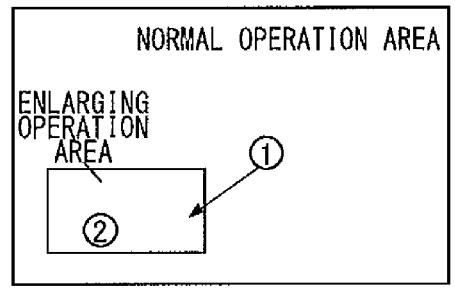

In the case as shown in FIG. 14B, the first touch point is provided in the normal operation area and the second touch point is provided in the enlarging operation area, and the first touch point is then dragged into the enlarging operation area. In this case, since the first touch point stays placed in the normal operation mode N even after entering the enlarging operation area, the operation mode for the second touch point also remains unchanged from the normal operation mode N. Also, since the second touch point is not dragged, the operation mode therefor will not be changed to the enlarging operation mode E originally.

Figure 14C:
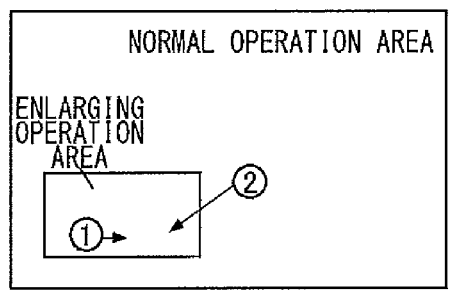

In the case as shown in FIG. 14C, the first touch point is provided in the enlarging operation area and dragged within the enlarging operation area, and the second touch point is provided thereafter in the normal operation area and dragged into the enlarging operation area. When the first touch point is dragged within the enlarging operation area, the operation mode therefor is switched from the normal operation mode N to the enlarging operation mode E. Since the second touch point is then provided in the normal operation area and set to the normal operation mode N, such setting is transmitted to the first touch point, so that the operation mode for the first touch point is switched from the enlarging operation mode E to the normal operation mode N. Thereafter, since the second touch point stays placed in the normal operation mode N even after entering the enlarging operation area, the operation mode for the first touch point also remains unchanged from the normal operation mode N.

Figure 14D:
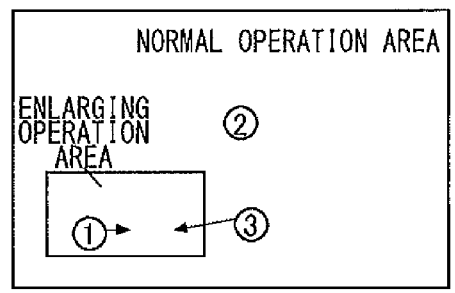

In the case as shown in FIG. 14D, the first touch point is provided in the enlarging operation area and dragged within the enlarging operation area, the second touch point is provided thereafter in the normal operation area, and the third touch point is further provided in the normal operation area and dragged into the enlarging operation area. In this case, since the first touch point is dragged within the enlarging operation area, the operation mode therefor is switched from the normal operation mode N to the enlarging operation mode E. The second touch point is then provided in the normal operation area and set to the normal operation mode N, and such setting is transmitted to the first touch point, so that the operation mode for the first touch point is switched from the enlarging operation mode E to the normal operation mode N. Thereafter, since the third touch point provided in the normal operation area stays placed in the normal operation mode N even after entering the enlarging operation area, the operation mode for the first and second touch points also remains unchanged from the normal operation mode N.

Thus, in the case of multi-touch input, if a touch point is provided in the normal operation area, another touch point dragged within the enlarging operation area will not be placed in the enlarging operation mode. This is because, since the user touches the normal operation area, the user obviously intends to provide touch input for the whole area of the touch panel, instead of providing touch input only for the enlarging operation area. Similarly, if another touch point is newly detected in the normal operation area during enlarging operation, the operation mode for all touch points will be switched from the enlarging operation mode to the normal operation mode. If any other touch point is not detected in the normal operation area, touch operation without dragging (tap operation) within the enlarging operation area will be regarded as for the normal operation mode, while drag operation within the enlarging operation area will be regarded as for the enlarging operation mode, in the same way as the case of single-touch input.

As described above, with the information processor according to the present embodiment, when a user touches the enlarging operation area without dragging and releases the finger from the touch panel at the position, such operation is regarded as a normal touch input for the touch panel, whereas, when a user touches the enlarging operation area and drags the touch point, the operation mode is switched to the enlarging operation mode and coordinate transformation is performed so as to regard such operation as a touch input for the whole area of the touch panel. Accordingly, touch operation for the whole area of the touch panel is enabled by merely touching and dragging a point within the enlarging operation area, which is part of the touch panel, instead of directly touching the large area of the touch panel.

Without complicate touch operation on the touch panel, a user can operate the whole area of the touch panel by merely dragging a point within the enlarging operation area provided in part of the touch panel so that the operation mode is switched to the enlarging operation mode; also, by merely releasing the finger from the touch panel, the operation mode can be set to the normal operation mode again. Therefore, pointing operation can be seamlessly switched between direct pointing to the touch panel in the normal operation mode and indirect pointing to the whole area of the touch panel in the enlarging operation mode.

The present invention has been described with reference to the embodiment. The embodiment is intended to be illustrative only, and it will be obvious to those skilled in the art that various modifications to constituting elements or processes could be developed and that such modifications also fall within the scope of the present invention.

Although the above embodiment describes an example of setting the enlarging operation area to the movable range of the thumb of the hand holding the touch panel display, the enlarging operation area may be set by a user to an arbitrary area on the touch panel display screen or may be set by an application to an appropriate area. For example, a character input screen may be displayed by an application, and, if the character input screen overlaps with the enlarging operation area, the enlarging operation area may be temporarily disabled or may be moved to another area that does not overlap with the character input screen. Also, in a game application, it may be preferable that the user can directly touch the whole area of the touch panel display. In such a case, the enlarging operation area need not necessarily be provided, so that the whole area of the touch panel display may be set to the normal operation area.

The invention claimed is:

1. A touch input processor, comprising:
   a touch coordinate acquisition unit configured to acquire the coordinate position of a touch point on a touch panel;
   an area determination unit configured to determine whether or not the coordinate position of a touch point is present within an enlarging operation area on the touch panel, part of the touch panel being defined as the enlarging operation area used to operate the whole area of the touch panel;
   a drag determination unit configured to determine if a touch point has been dragged;
   an operation mode switching unit configured to switch, when the coordinate position of a touch point is present within the enlarging operation area and the touch point has been dragged, the operation mode for touch input from a normal operation mode to an enlarging operation mode; and
   a touch coordinate transformation unit configured to transform, when the operation mode is switched to the enlarging operation mode, the coordinates of an actual touch point within the enlarging operation area into the coordinates of a virtual touch point for an entire area of the touch panel.

2. The touch input processor of claim 1, wherein:
   when the coordinate position of a touch point is present outside the enlarging operation area, the operation mode switching unit sets the operation mode for touch input to the normal operation mode; and,
   in the normal operation mode, the touch coordinate transformation unit outputs the coordinates of an actual touch point outside the enlarging operation area as the coordinates of a touch point for the entire area of the touch panel.

3. The touch input processor of claim 1, wherein:
   when the coordinate position of a touch point is present within the enlarging operation area but the touch point has not been dragged, the operation mode switching unit maintains the normal operation mode instead of switching to the enlarging operation mode; and,
   in the normal operation mode, the touch coordinate transformation unit outputs the coordinates of an actual touch point within the enlarging operation area as the coordinates of a touch point for the entire area of the touch panel.

4. The touch input processor of claim 1, wherein, when the area determination unit determines that a dragged touch point has been moved out of the enlarging operation area, the operation mode switching unit switches the operation mode from the enlarging operation mode to the normal operation mode.

5. The touch input processor of claim 2, wherein, when the area determination unit determines that a touch point that is outside the enlarging operation area has been dragged into the enlarging operation area, the operation mode switching unit maintains the normal operation mode instead of switching to the enlarging operation mode.

6. The touch input processor of claim 1, wherein, if the touch panel unit supports multi-touch and the touch coordinate acquisition unit acquires the coordinate positions of a plurality of touch points of multi-touch input, the operation mode switching unit will switch, when the coordinate position of a touch point is present within the enlarging operation area and the touch point has been dragged and when any other touch point is not present outside the enlarging operation area, the operation mode for touch input from the normal operation mode to the enlarging operation mode with respect to all the touch points.

7. The touch input processor of claim 6, wherein, when at least one touch point is present outside the enlarging operation area, the operation mode switching unit sets the operation mode for touch input to the normal operation mode with respect to all the touch points.

8. An information processor, comprising:
   a touch panel unit including a touch panel and a touch panel controller configured to detect a touch input on the touch panel and output the touch input as a signal;
   a touch input processing unit configured to process information on a touch input detected by the touch panel unit; and
   a display control unit configured to control data to be displayed on a display device on which the touch panel is provided,
   the touch input processing unit including:
      a touch coordinate acquisition unit configured to acquire the coordinate position of a touch point;
      an area determination unit configured to determine whether or not the coordinate position of a touch point is present within an enlarging operation area on the touch panel, part of the touch panel being defined as the enlarging operation area used to operate an entire area of the touch panel;
a drag determination unit configured to determine if a touch point has been dragged;
an operation mode switching unit configured to switch, when the coordinate position of a touch point is present within the enlarging operation area and the touch point has been dragged, the operation mode for touch input to an enlarging operation mode; and
a touch coordinate transformation unit configured to transform, when the operation mode is switched to the enlarging operation mode, the coordinates of an actual touch point within the enlarging operation area into the coordinates of a virtual touch point for the entire area of the touch panel.

9. A touch input control method for controlling a touch input on a touch panel, the method comprising:
acquiring the coordinate position of a touch point on a touch panel;
determining whether or not the coordinate position of a touch point is present within an enlarging operation area on the touch panel, part of the touch panel being defined as the enlarging operation area used to operate an entire area of the touch panel;
determining if a touch point has been dragged;
switching, when the coordinate position of a touch point is present within the enlarging operation area and the touch point has been dragged, the operation mode for touch input from a normal operation mode to an enlarging operation mode; and
transforming, when the operation mode is switched to the enlarging operation mode, the coordinates of an actual touch point within the enlarging operation area into the coordinates of a virtual touch point for the entire area of the touch panel.

10. A computer program embedded on a non-transitory computer-readable recording medium, comprising:
a module configured to acquire the coordinate position of a touch point on a touch panel;
a module configured to determine whether or not the coordinate position of a touch point is present within an enlarging operation area on the touch panel, part of the touch panel being defined as the enlarging operation area used to operate an entire area of the touch panel;
a module configured to determine if a touch point has been dragged;
a module configured to switch, when the coordinate position of a touch point is present within the enlarging operation area and the touch point has been dragged, the operation mode for touch input from a normal operation mode to an enlarging operation mode; and
a module configured to transform, when the operation mode is switched to the enlarging operation mode, the coordinates of an actual touch point within the enlarging operation area into the coordinates of a virtual touch point for an entire area of the touch panel.

11. A non-transitory computer-readable recording medium encoded with the computer program of claim 10.

* * * * *